United States Patent [19]

Goto

[11] Patent Number: 5,774,230
[45] Date of Patent: Jun. 30, 1998

[54] COLOR IMAGE PROCESSING APPARATUS FOR COLOR-CORRECTING INPUT IMAGE DATA USING NEURAL NETWORK

[75] Inventor: Makio Goto, Yamatokoriyama, Japan

[73] Assignee: Sharp Kabushiki Kaisha, Osaka, Japan

[21] Appl. No.: 652,790

[22] Filed: May 23, 1996

[30] Foreign Application Priority Data

Jun. 21, 1995 [JP] Japan .................................. 7-155029

[51] Int. Cl.⁶ .............................. H04N 1/40; H04N 1/46; G03F 3/08; G06F 15/18
[52] U.S. Cl. .......................... 358/298; 358/518; 358/523; 395/21
[58] Field of Search .................................. 358/296, 298, 358/504, 518, 520, 523, 530; 382/162, 167; 395/21, 23

[56] References Cited

U.S. PATENT DOCUMENTS

| | | | |
|---|---|---|---|
| 5,025,282 | 6/1991 | Nakamura et al. | 355/77 |
| 5,162,899 | 11/1992 | Nada et al. | 358/518 |
| 5,164,837 | 11/1992 | Hirosawa | 358/296 |
| 5,546,195 | 8/1996 | Aarai | 358/518 |
| 5,636,290 | 6/1997 | Kita et al. | 382/167 |

FOREIGN PATENT DOCUMENTS

| | | | |
|---|---|---|---|
| 2-241271 | 9/1990 | Japan | H04N 1/46 |
| 5-153381 | 6/1993 | Japan | H04N 1/46 |

*Primary Examiner*—Eric Frahm
*Attorney, Agent, or Firm*—David G. Conlin; William J. Daley, Jr.

[57] ABSTRACT

A color image processing apparatus including a read device for reading an original image, a color correcting device for color-correcting input image data using a color-correcting neural network, and an output device for outputting color-corrected image data. The neural network with teacher data, which are in effect learning color data reflecting the visual characteristics of human eyes, using learning data produced by reading a copy image produced based on the learning color data. Accordingly, the neural network can correct colors accurately in a manner to fully reflect the visual characteristics of human eyes, thereby making the color difference between the original image and a copy of the same less noticeable.

10 Claims, 6 Drawing Sheets

COLOR IMAGE PROCESSING APPARATUS FOR COLOR-CORRECTING INPUT IMAGE DATA USING NEURAL NETWORK

FIELD OF THE INVENTION

The present invention relates to a color image processing apparatus, such as a color copying machine and a color printing machine, furnished with a color correcting function.

BACKGROUND OF THE INVENTION

A color image processing apparatus, such as a color copying machine and a color printing machine, is known as an image input/output apparatus which reads a color original image by a color scanner or the like serving as read means and outputs a copy image by a color printer or the like serving as output means.

However, a copy image produced by the above color image processing apparatus hardly renders exactly the same colors as those of the original image even when input image data are supplied to the output means intact.

To eliminate this problem, there has been proposed a method of color-correcting the input image data using a neural network in such a manner to approximate the colors of a copy image to those of the original image. An example of such a method is disclosed in Japanese Laid-open Patent Application No. 2-241271 (1990). In a color correcting device in the cited application, a limited number of color samples, together with a color separation signal of the color samples and a color separation signal of color-corrected color samples, are supplied to a neural network. Then, the neural network learns color correcting parameters adaptively and optimizes the same, thereby enhancing accuracy in color correction.

Another example is disclosed in Japanese Laid-open Patent Application No. 5-153381 (1993). In a color image processing apparatus in the cited application, a neural network circuit converts a color separation signal of light reflected from or passing through an original image into an optimal density signal through learning and corrects colors accurately.

In general, a color scanner or the like serving as read means scans a color original image and sends a color separation signal of R(Red), G(Green), and B(Blue) to the neural network. Then, the neural network converts the same into a density signal of C(Cyan), M(Magenta), and Y(Yellow) and supplies the same to a printer or the like serving as output means. Hereinafter, the firstly- and secondly-mentioned signals are referred to as a RGB signal and a CMY signal, respectively.

This means each RGB value must have a CMY value as a color-corrected value in response to an input of the same. A combination of the RGB value and CMY value (which is referred to as a RGB-CMY combination, hereinafter) is computed in the overall color space, for example, in the following manner: a color scanner or the like serving as read means optically scans an image with reference to a sample of 729 colors in CMY color representation, nine steps from each.

The neural network eventually learns optimal RGB-CMY combinations in the overall color space using the learning data, in other words, the neural network learns to minimize an error between a CMY value in the combination and a corresponding CMY value in the teacher data. By so doing, the neural network corrects colors in such a manner to approximate colors of a copy image to those of the original image as close as possible.

Incidentally, the sense of sight largely depends on color brightness, that is to say, human eyes are highly sensitive to low saturation colors, such as a flesh color and sky blue, while they are less sensitive to high saturation colors, such as yellow. Therefore, some colors may not be corrected as effective as was expected even if an error between the CMY value in the teacher data and the CMY value in the combination is small in numerical value.

Thus, if the neural network corrects every color in the overall color space in the above manner, there is a small error of the same numerical value between each CMY value in the combination and a corresponding CMY value in the teacher data; however, the color difference between an original image and a copy thereof remains noticeable in some low saturation colors, such as a flesh color and sky blue, or colors to which human eyes are highly sensitive.

SUMMARY OF THE INVENTION

It is therefore an object of the present invention to provide a color image processing apparatus capable of producing a copy image having less noticeable color difference from an original image by converting input image data of the original image into output image data in a manner fully reflecting the visual characteristics of human eyes.

To fulfill the above object, a color processing apparatus of the present invention includes a read device for reading an original image, a color correcting device for color-correcting input image data using a color-correcting neural network, and an output device for outputting color-corrected image data. The color processing apparatus is characterized in that (1) the neural network is constructed in a manner to learn with teacher data and learning data, and (2) the teacher data are learning color data produced by adding data of colors, to which human eyes are highly sensitive, to data of master color samples and/or deleting data of colors, to which human eyes are less sensitive, from the master color samples data. The learning data are produced by reading the image of a copy image produced based on the above learning color data.

According to the above structure, the color-correcting neural network learns using the learning color data as the teacher data with the learning data. The learning color data are produced by adding data of colors, to which human eyes are highly sensitive, such as a flesh color and sky blue, to the master color samples data and/or deleting data of colors, to which human eyes are less sensitive, such as yellow, from the master color samples data; the learning data are produced by the read device as it reads a copy-image which the output device produced based on the learning color data. Accordingly, the neural network such that corrects colors in a manner to fully reflect the visual characteristics of human eyes can be constructed.

The color-correcting neural network thus constructed corrects colors in accordance with the visual characteristics of human eyes, thereby making the resulting copy image more realistic. Hence, the present invention can provide a color image processing apparatus capable of producing a copy image on which color difference from the original image is less noticeable.

For a fuller understanding of the nature and advantages of the invention, reference should be made to the ensuing detailed description taken in conjunction with the accompanying drawings.

DESCRIPTION OF THE EMBODIMENTS (First Embodiment)

Figure 1:
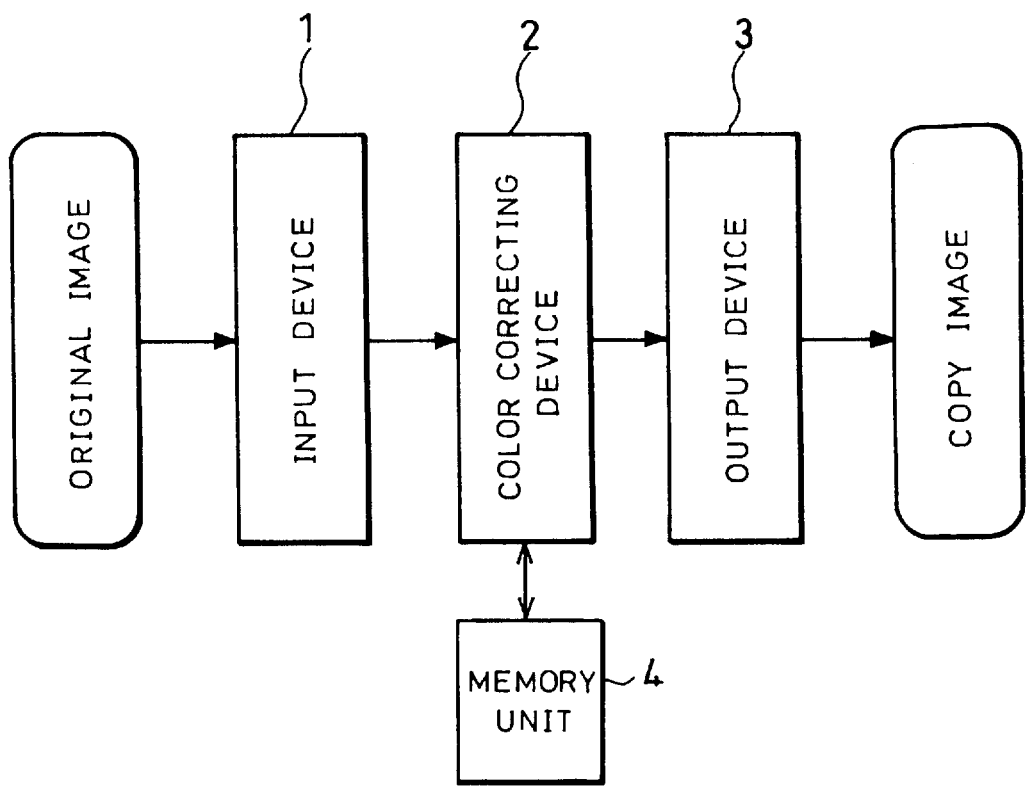
FIG. 1 is a schematic block diagram showing an example color image processing apparatus in accordance with the present invention.
Figure 2:
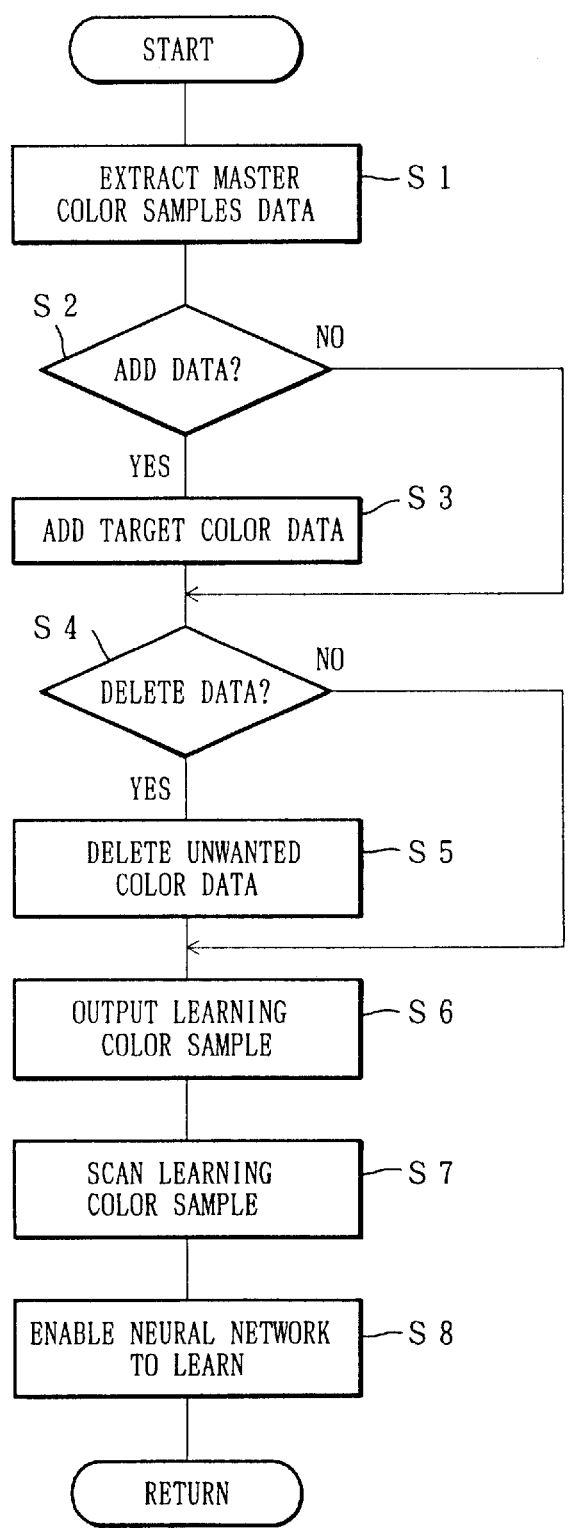
FIG. 2 is a flowchart detailing a construction procedure of a neural network equipped in a color correcting device of the color image processing apparatus of FIG. 1.
Figure 3:
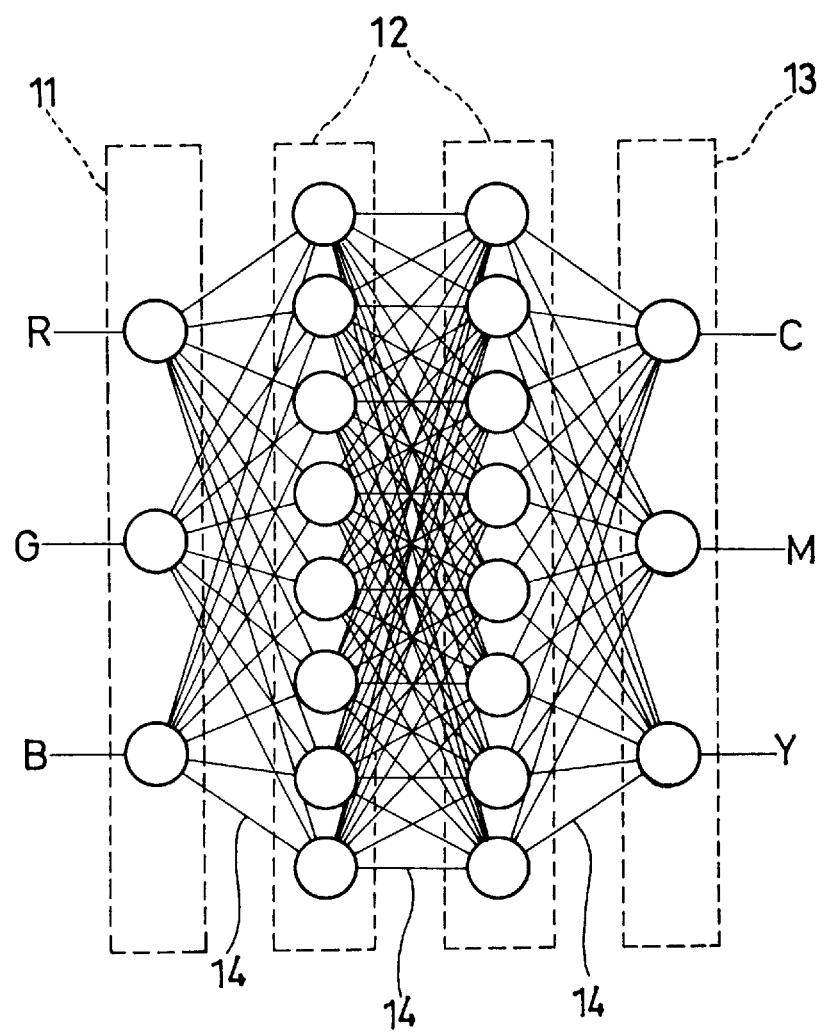
FIG. 3 is a schematic view showing an example structure of the neural network of FIG. 2.

Referring to FIGS. 1 through 3, the following description will describe an example embodiment of the present invention.

As shown in FIG. 1, an example color image processing apparatus of the present invention includes an input device 1 for inputting image information of an original image, a color correcting device 2 for correcting color data of the input image information, and an output device 3 for producing a copy image by outputting image information containing the color-corrected color data.

To be more specific, the input device 1 includes a color scanner as read means, which optically scans a color original image and produces a color separation signal of R(Red), G(Green), and B(Blue) (referred to as RGB signal, hereinafter). The color scanner used herein is capable of producing a RGB signal with 256 levels each.

The output device 3 includes a color printer as output means and produces a copy image based on a density signal of C(Cyan), M(Magenta), and Y(Yellow) (referred to as CMY signal, hereinafter). The color printer used herein is capable of printing an image in CMY color representation with 256 levels each.

The color correcting device 2 is equipped with a color-correcting neural network. Although a detailed description will be given below, it is this neural network that receives a RGB signal of an original image and converts the same into a color-corrected CMY signal of a copy image in such a manner to approximate the colors of the copy image to those of the original image.

A memory unit 4, which serves as storage means, is connected to the color correcting device 2. The memory unit 4 stores color data with which the neural network operates or learns, such as master color samples data and teacher data.

Note that, when the neural network equipped in the color correcting device 2 converts a RGB signal into a CMY signal (through computation) to match the colors of a copy image with those of an original image, the neural network must minimize an error between an output CMY value and a corresponding CMY value in the teacher data. Minimizing an error for each color demands an adequate color samples for computation, or master color samples. Herein, the master color samples are selected at regular intervals in the overall color space of the CMY color representation. For example, assume that each of CMY colors includes nine groups each having 32 steps and 729 combinations are made by selecting one group from each of CMY colors, then some master color samples are selected from these 729 combinations in such a manner to place the same at regular intervals in the overall color space of the CMY color representation. Data of the master color samples thus selected are stored in the memory unit 4.

The neural network learns using the master color samples data as the teacher data, and eventually reduces errors between the output CMY values in all the combinations in the overall color space and corresponding CMY values in the teacher data to one small numerical value.

Incidentally, the sense of sight largely depends on color brightness, that is to say, human eyes are highly sensitive to low saturation colors, such as a flesh color and sky blue, while they are less sensitive to high saturation colors, such as yellow. Therefore, correction of some colors may not be as effective as was expected even if an error between the CMY value in the teacher data and the CMY value in the combination is small in numerical value.

The color image processing apparatus of the present embodiment solves this problem by: 1) producing learning color samples, with which colors can be corrected in a manner to fully reflect the visual characteristics of human eyes, by selectively adding/deleting desired color data to/from the master color samples data; 2) constructing a color-correcting neural network such that uses the above learning color samples as the teacher data.

Next, the construction of the above color-correcting neural network will be described with reference to the flowchart in FIG. 2.

To begin with, the master color samples data pre-stored in the memory unit 4 are extracted (S1).

Then, whether any low saturation color, such as a flesh color and sky blue, to which human eyes are highly sensitive, should be added to the master color samples or not is determined (S2).

When it is determined to add a low saturation color, for example, a flesh color, data of a color sample of the same is added to the master color samples data as target color data (S3). When a flesh color is preferably converted in a more accurate manner, a few to tens of color samples of the same are added to the master color samples data. In practice, the scanner reads the flesh color sample and the RGB-CMY combination thereof is added to the master color samples data. When it is determined not to add any low saturation color in S2, the flow skips to S4.

Then, whether any high saturation color, such as yellow, to which human eyes are less sensitive, should be deleted from the master color samples or not is determined (S4). When it is determined to delete a high saturation color, for example, yellow, data of a color sample of the same are deleted from the master color samples data as unwanted color data (S5). In practice, the RGB-CMY combination of the unwanted color is deleted from the master color samples data. If it is determined not to delete any high saturated color in S4, the flow skips to S6. The color samples data obtained in S1 through S5 are defined as the teacher data with which the neural network learns.

Then, the color samples data obtained in S1 through S5 are supplied to the output device 3, which prints out the same as a learning color sample (S6).

Next, the color scanner of the input device 1 reads (scans) an image of the learning color sample and separates the same into a RGB signal (S7). Accordingly, the neural network starts to learn using the RGB signals produced in S7 as learning (input) data with the teacher data obtained in S1 through S5 (S8). The color-correcting neural network is constructed in the above manner.

The color-correcting neural network thus constructed comprises, as shown in FIG. 3, an input layer 11 for inputting a RGB value, an output layer 13 for outputting a CMY value, and an intermediate layer 12 placed between the input layer 11 and output layer 13; each layer is linked to another by linking weights 14. To be more specific, when the learning (input) data RGB are supplied to the input layer 11, the linking weights 14 are changed in such a manner that the output layer 13 outputs a value approximate to the CMY value in the teacher data. This is how the color-correcting neural network learns. Eventually, the neural network becomes an optimal one such that minimizes an average error between the output value in response to the-learning (input) data RGB and the CMY value in the teacher data.

As has been explained, the color correcting device 2 in the color image processing apparatus of the present embodiment is equipped with the neural network that has learned with the teacher data, which are in effect learning color samples fully reflecting color correction in accordance with the visual characteristics of human eyes, and it is this neural network that converts a RGB signal (color separation signal) of the original image from the color scanner of the input device 1 into a CMY signal (density signal) for the color printer of the output device 3.

Accordingly, the neural network corrects colors in a manner to fully reflect the visual characteristics of human eyes. As a result, not only colors are corrected in a more accurate manner, but also color difference between the original image and a copy image becomes less noticeable.

As has been explained, the learning color sample, which the color-correcting neural network uses as the teacher data, comprises color samples produced by adding data of colors to which human eyes are highly sensitive and/or deleting data of colors to which human eyes are less sensitive to/from the master color samples data. Thus, the neural network uses the learning color sample that best reflects color correction in accordance with the visual characteristics of human eyes In other words, the learning color sample additionally includes data of low saturation colors, such as a flesh color and sky blue, to which human eyes are highly sensitive, while omitting data of high saturation colors, such as yellow, to which human eyes are less sensitive. This is the reason why the learning color sample fully reflects the color correction in accordance with the visual characteristics of human eyes.

As a result, the neural network corrects colors in a manner to fully reflect the visual characteristics. Thus, not only colors are corrected in a more accurate manner, but also the color difference between the original image and a copy image becomes less noticeable.

Since a CMY color representation printer is used herein, the output layer 13 of the neural network of FIG. 3 has three units. If a CMYK color representation printer is used instead, the number of the units of the output layer 13 is increased to four and so is the number of the units of the other layers to corresponding numbers. However, such a modified neural network can also realize substantially the same effect explained above.

(Second Example)

Figure 4:
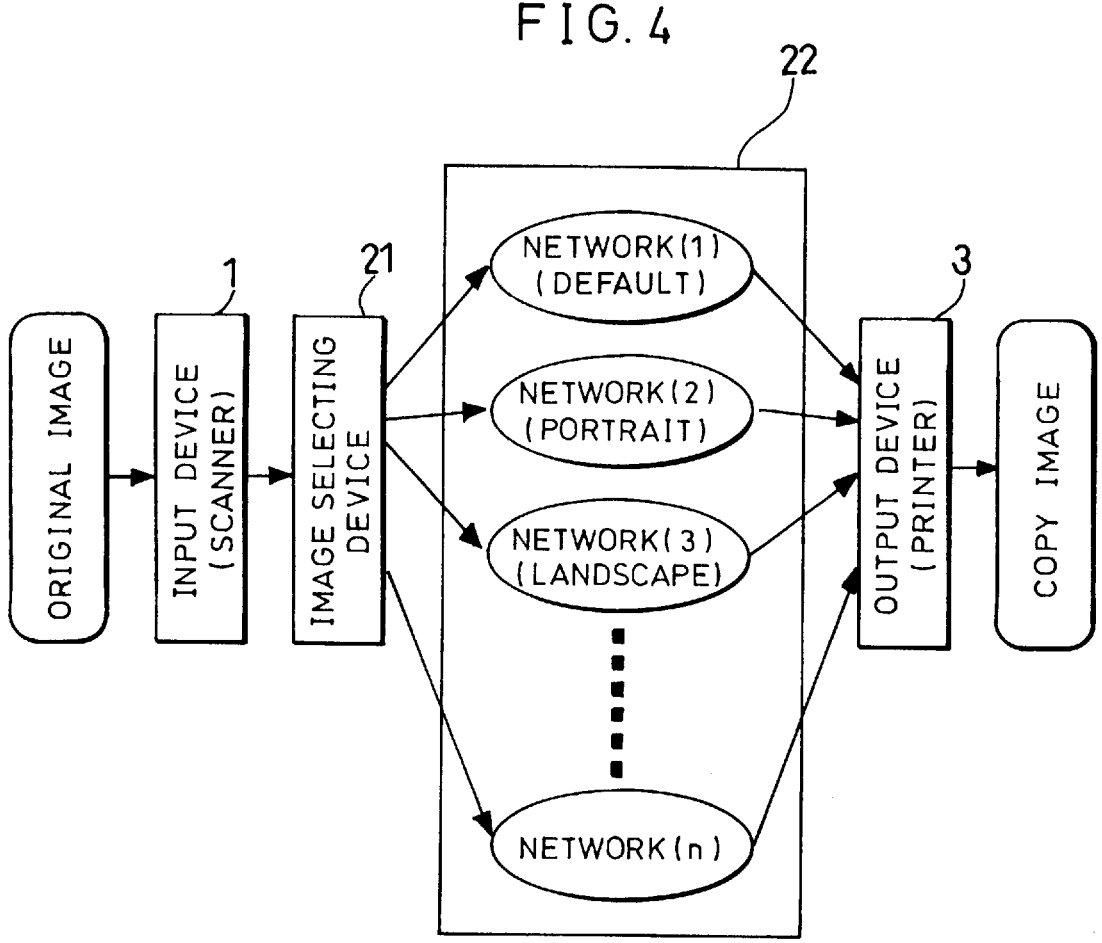
FIG. 4 is a schematic block diagram showing another example color image processing apparatus in accordance with the present invention.
Figure 5:
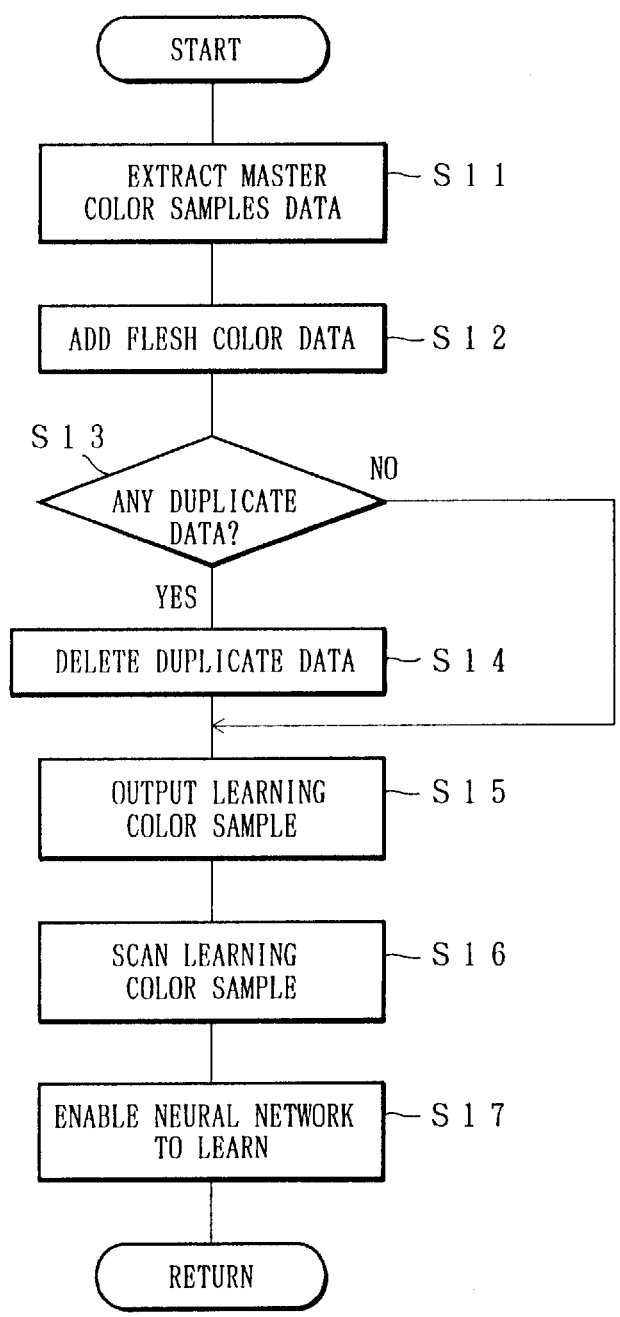
FIG. 5 is a flowchart detailing a construction procedure of a neural network equipped in a color correcting device of the color image processing apparatus of FIG. 4.

Referring to FIGS. 4 and 5, the following description will describe another example embodiment of the present invention. Hereinafter, like components are labeled with like reference numerals with respect to the first embodiment, and the description of these components is not repeated for the explanation's convenience.

In the first embodiment, the accuracy in color correction is upgraded by the color correcting device 2; however, the color-correcting neural network constructed therein is intended for color correction based on one specific color characteristic. Thus, if some original images having their respective color characteristics are copied, one can be copied in a satisfactory manner while the others are not. To be more specific, both a portrait and a landscape are drawn mostly in low saturated colors. However, each has their respective color characteristics: the former mainly uses a flesh color while the latter a sky blue. In short, if there is only one neural network, satisfactory color correction is limited to an original image having the same color characteristic to that of the neural network. To solve this problem, a color image processing unit of the present embodiment, as shown in FIG. 4, includes a color correcting device 22 instead of the color correcting device 2 of the first embodiment in FIG. 1.

The color correcting device 22 includes a plurality of color-correcting neural networks for individual color characteristics of input image data including a portrait and a landscape: a default neural network (1), a portrait neural work (2), a landscape neural network (3), . . . , a network (n).

Hence, a color-corrected density signal from an adequate color-correcting neural network in the color correcting device 22 is inputted into the output device 3.

In addition, an image selecting device 21 is provided between the input device 1 and color correcting device 22, so that the color-correcting neural networks are automatically switched depending on the kind of the input image data from the input device 1.

More precisely, the image selecting device 21 automatically judges the kind of an original image, such as a portrait and a landscape, based on the characteristics of the input RGB signal reflecting a specific characteristic of the original image, and outputs the judgment to the color correcting device 22. Alternatively, the user may judge the kind of an original image and manually input the judgement data to the color correcting device 22 using a manipulation panel or the like.

Next, the construction of the color-correcting neural network will be described with reference to the flowchart in FIG. 5. Note that the portrait neural network will be explained as a example.

To begin with, master color samples data pre-stored in the memory unit 4 are extracted (S11).

Then, tens of samples of a typical flesh color, are added to the extracted master color samples data (S12). At the same time, whether there are any duplicate data in the additional flesh color data and master color samples data or not, or the additional flesh color data include any similar color in the master color samples data is judged (S13). The duplicate data and similar color data are collectively referred to as duplicate data, hereinafter.

If there exist the duplicate data in S13, the duplicate data are deleted from the additional flesh color data (S14). Otherwise, the flow skips to S15. The duplicate data are deleted in the same manner as S5 in the first embodiment. The color samples data obtained in S11 through S14 are defined as the teacher data with which the neural network learns.

Then, the color samples data obtained in S11 through S14 are supplied to the output device 3, which prints out the same as a learning color sample (S15).

Next, the color scanner of the input device 1 reads an image on the learning color sample and separates the same into a RGB signal (color separation signal) (S16). Accordingly, the neural network learns using the RGB signal as the learning (input) data with the teacher data obtained in S11 through S14 (S17). The portrait neural network is constructed in the manner above.

The color-correcting neural networks other than the portrait neural network, such as the landscape neural network, can be constructed in the same manner as detailed in S11 through S17.

The portrait neural network is of the same structure as its counterpart in the first embodiment of FIG. 3, and learns in the same manner. That is to say, when the learning (input) data RGB are supplied to the input layer 11, the linking weights 14 are changed in such a manner that the output layer 13 outputs a value approximate to the CMY value in the teacher data.

As has been explained, the color image processing apparatus of the present embodiment includes various type of color-correcting neural networks for color-correcting a portrait, a landscape, etc. having their respective color characteristics. The color-correcting neural networks are switched in response to the characteristics of the input image data, so that colors are corrected in such a manner that a copy image renders the color characteristics of the input image data as truly as possible.

Utilizing a plurality of color-correcting neural networks for individual color characteristics can further upgrade the accuracy in color correction while making the color difference between the original image and a copy image less noticeable.

(Third Embodiment)

Figure 6:
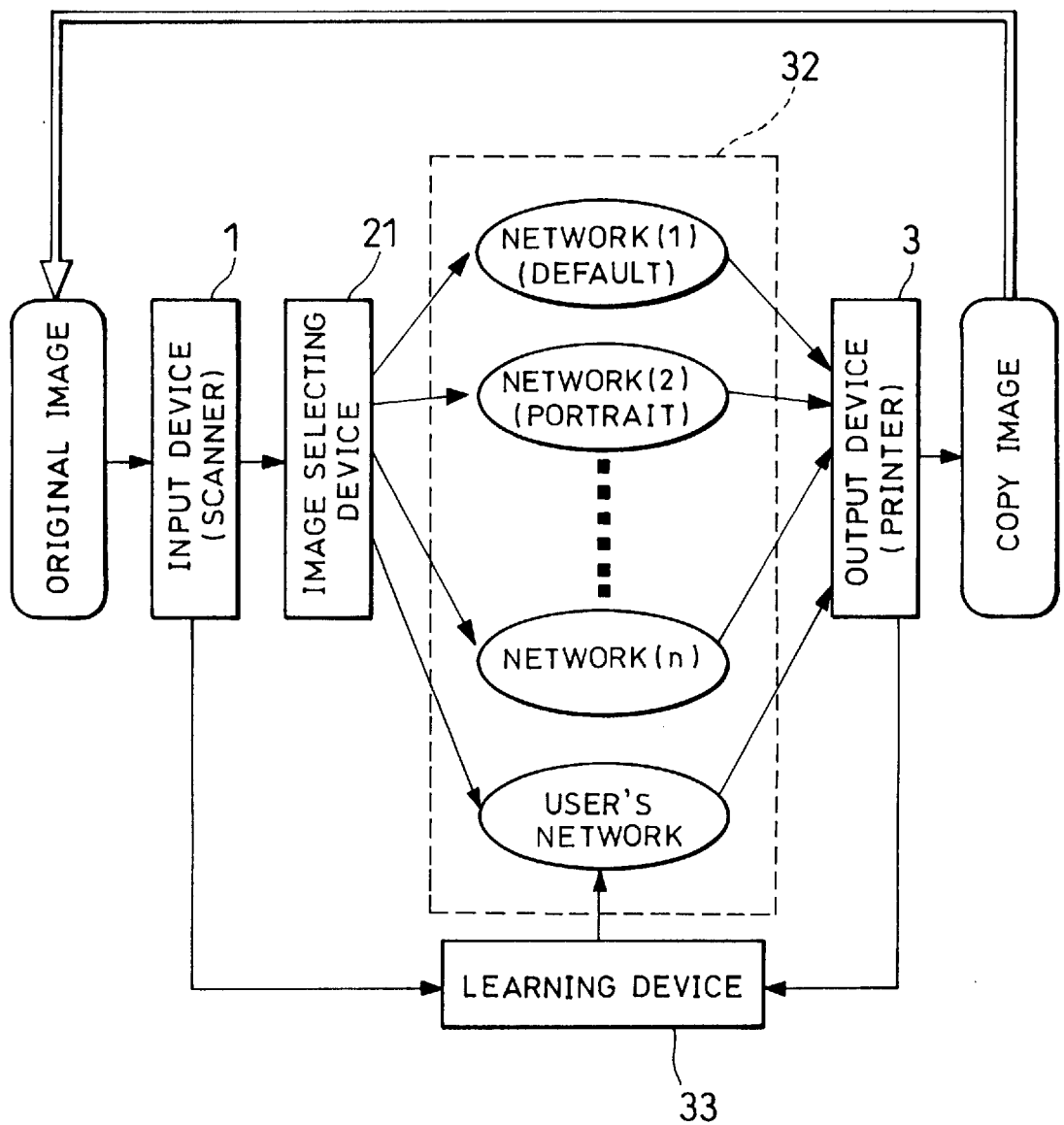
FIG. 6 is a schematic block diagram showing still another example color image processing apparatus in accordance with the present invention.

Referring to FIG. 6, the following description will describe still another example embodiment of the present invention.

Herein, colors can be corrected as desired by the user. To be more specific, a color image processing apparatus of the present embodiment, as shown in FIG. 6, includes a color correcting device 32 instead of the color correcting device 22 of the second embodiment in FIG. 4.

The color correcting device 32 is equipped with a user's neural network in addition to those equipped in the color correcting device 22. A learning device 33 is connected to the user's neural network to supply learning data and teacher data.

The learning device 33 produces the learning data and teacher data, which are supplied to the user's neural network, using density data outputted from the color correcting device 32 and input image data read by the input device 1 from a copy image outputted from the output device 3 based on the density data.

The user's neural network includes linking weights of the same type used in its counterpart in the first embodiment, and is capable of correcting colors in the overall color space in a satisfactory manner. The linking weights are changed depending on the learning data supplied from the learning device 33.

The above structure enables the user's neural network to correct colors in accordance with the user's choice and circumstances.

The following description will describe the construction of the user's neural network.

When a latest copy image from the color image processing apparatus of FIG. 6 after the color correction in accordance with the color characteristic of the original image is still unsatisfactory to the user, the user starts the optical scanning of the latest copy image by the input unit 1. At this point, a representative value of the density values used when producing the latest copy image, and a color separation value obtained through reading the latest copy image by the input device 1 are inputted into the learning device 33.

Then, the learning device 33 updates the learning data held therein since the initialization by adding the above representative value of the color separation signal. The learning device 33 also updates the teacher data held therein since the initialization by adding the above representative value of the density values.

The updated learning data and teacher data are inputted into the color correcting device 32 from the learning device 33, upon which the user's neural network starts to learn, in other words, the user's neural network is constructed.

Once the user's neural network is constructed in this manner, colors are always corrected by the user's neural network afterwards.

As has been explained, the color image processing apparatus of the present embodiment includes the user's neural network in the color correcting device 32 that learns with the teacher data, which are in effect the color samples data produced using the color-corrected image data and input image data read from a copy image produced based on the above color-corrected image data. This means that the user can arbitrary change the linking weights of the neural network depending on a subject image in such a manner to minimize a color correction error. In other words, colors can be corrected in accordance with the user's choice and circumstances.

A first color processing apparatus of the present invention includes read means for reading an original image, color correcting means for color-correcting input image data using a color-correcting neural network, and output means for outputting color-corrected image data. The color-correcting neural network is constructed in a manner to learn using teacher data and learning data. The teacher data are learning color data produced by adding data of colors, to which human eyes are highly sensitive, to data of master color samples and/or deleting data of colors, to which human eyes are less sensitive, from the master color samples data. The learning data are produced by reading the image of a copy image produced based on the above learning color data.

According to the above structure, the color-correcting neural network learns using the learning color data as the teacher data with the learning data. The learning color data are produced by adding data of colors, to which human eyes are highly sensitive, such as a flesh color and sky blue, to the master color samples data and/or deleting data-of colors, to which human eyes are less sensitive, such as yellow, from the master color samples data. The learning data are produced by the read means as it reads a copy image which the output means produced based on the learning color data. Accordingly, the neural network such that corrects colors in a manner to fully reflect the visual characteristics of human eyes can be constructed.

The color-correcting neural network thus constructed corrects colors in accordance with the visual characteristics of human eyes, thereby making the resulting copy image more realistic. Hence, the first color image processing apparatus of the present invention can produce a copy image on which color difference from the original image is less noticeable.

A second color image processing apparatus is of the same structure as the first color image processing apparatus except that the color correcting means includes a plurality of color-correcting neural networks for individual color characteristics of input image data, and thus, characterized in that colors in the input image data are corrected depending on its color characteristic using an adequate color-correcting neural network.

To be more specific, the color correcting means includes a plurality of neural networks for individual color characteristics, such as a portrait neural network and a landscape neural network. Thus, colors are corrected in response to the color characteristics of the input image data by switching the neural networks in an adequate manner. As a result, the output image data reflect the color characteristics of the input image data as truly as possible. This enhances the accuracy in color correcting further, and therefore, the color difference between the original image and a copy of the same becomes less noticeable.

A third color image processing apparatus of the present invention is of the same structure as its counterpart in the first or second embodiment except that the color correcting means further includes another type of color-correcting neural network. Unlike the neural network(s) in the first or second color image processing apparatus, the neural network of the third color image processing apparatus uses color-corrected image data as the teacher data and input image data read form the copy image produced based on the color-corrected image data as learning data.

Accordingly, the color correcting means includes a color-correcting neural network that learns using color-corrected image data as the teacher data with the input image data read from the copy image produced based on the post-correction image data as the learning data. This structure enables the user to change the linking weights of the neural network arbitrary depending on a subject image to minimize a color correction error. In short, the user can correct colors in accordance with his choice or circumstances.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A color image processing apparatus including:

read means for reading an original image;

color correcting means for color-correcting input image data using a color-correcting neural network; and output means for outputting color-corrected image data;

said color-correcting neural network learning using teacher data and learning data, said teacher data being learning color data produced by adding data of a first color and/or deleting data of a second color to/from data of master color samples, said first color being a color to which human eyes are highly sensitive, said second color being a color to which human eyes are less sensitive, said learning data being image data produced by said read means as said read means reads an image produced by said output means based on said learning color data.

2. The color image processing apparatus as defined in claim 1, wherein said color correcting means includes a plurality of color-correcting neural networks for individual color characteristics of said input image data, so colors of the input image data are corrected using a neural network for a specific color characteristic in response to a color characteristic of the input image data.

3. The color image processing apparatus as defined in claim 1, wherein said color correcting means includes a color-correcting neural network which learns using teacher data and learning data, said teacher data being latest color-corrected image data, said learning data being input image data produced by said read means as said read means reads an image produced by said output means based on said latest color-corrected image data.

4. The color image processing apparatus as defined in claim 2, wherein said color correcting means includes a color-correcting neural network which learns using teacher data and learning data, said teacher data being latest color-corrected image data, said learning data being input image data produced by said read means as said read means reads an image produced by said output means based on said latest color-corrected image data.

5. The color image processing apparatus as defined in claim 1 further including a memory unit for storing the master color samples data and said learning color data used as said teacher data, said memory unit being connected to said color correcting means.

6. The color image processing apparatus as defined in claim 1, wherein said color correcting means converts the input image data in the form of a RGB signal into one of a CMY signal and a CMYK signal.

7. The color image processing apparatus as defined in claim 1, wherein said color correcting means includes a portrait neural network and a landscape neural network in said plurality of color-correcting neural networks.

8. The color image processing apparatus as defined in claim 7 further including an image selecting device for judging whether an original image is a portrait or a landscape, and said image selecting device for selecting one of said portrait neural network and landscape neural network based on said judgement.

9. The color image processing apparatus as defined in claim 1, wherein said color correcting means includes a general neural network and a user's neural network in said plurality of color-correcting neural networks.

10. The color image processing apparatus as defined in claim 9 further including a learning device for supplying the learning data and the teacher data to said user's neural network.

* * * * *